United States Patent [19]

Ishikawa, deceased et al.

[11] Patent Number: 5,277,433
[45] Date of Patent: Jan. 11, 1994

[54] METAL LAMINATE GASKET WITH SURFACE PRESSURE ADJUSTING RING

[75] Inventors: Katsushiro Ishikawa, deceased, Tokyo, Japan, Multiple heirs: by Itsuo Ishikawa, Hiroko Ishikawa, Yukiko Kojima, Machiko Hagiwara, Taeko Tao, heirs; Itsuo Ishikawa, Tokyo, Japan

[73] Assignee: Ishikawa Gasket Co., Ltd., Tokyo, Japan

[21] Appl. No.: 887,519

[22] Filed: May 26, 1992

[30] Foreign Application Priority Data

May 30, 1991 [JP] Japan .............................. 3-039823[U]

[51] Int. Cl.$^5$ ................................ F16J 15/32
[52] U.S. Cl. ................................ 277/235 B; 277/180
[58] Field of Search ........ 277/180, 235 B, 236, 235 R

[56] References Cited

U.S. PATENT DOCUMENTS

| | | | |
|---|---|---|---|
| 4,739,999 | 4/1988 | Ishii et al. | 277/236 |
| 4,776,601 | 10/1988 | Yamada | 277/235 B |
| 4,791,897 | 12/1988 | Udagawa | 277/235 B |
| 4,807,892 | 2/1989 | Udagawa | 277/235 B |
| 5,169,163 | 12/1992 | Udagawa et al. | 277/236 |
| 7,573,870 | 4/1971 | Gastineau | 277/180 |

FOREIGN PATENT DOCUMENTS

| | | | |
|---|---|---|---|
| 0208349 | 1/1987 | European Pat. Off. | 277/235 B |
| 0229037 | 12/1984 | Japan | 277/235 B |
| 0227853 | 9/1989 | Japan | 277/235 B |
| 0156156 | 7/1991 | Japan | 277/235 B |

Primary Examiner—William A. Cuchlinski, Jr.
Assistant Examiner—Daniel G. DePumpo
Attorney, Agent, or Firm—Kanesaka and Takeuchi

[57] ABSTRACT

The metal laminate gasket of the invention is used for an internal combustion engine having a hole to be sealed. The gasket is formed of a plurality of metal plates for constituting the metal laminate gasket, and a device for defining the hole of the engine with a curved portion and a flange. Inside the curved portion around the hole, a wire ring, at least one bead and a hollow ring are situated. The hollow ring is arranged between the curved portion and the bead. The thickness of a metal plate for the hollow ring is adjusted so that the surface pressures on the wire ring and the bead are regulated by the hollow ring when the gasket is tightened.

9 Claims, 1 Drawing Sheet

METAL LAMINATE GASKET WITH SURFACE PRESSURE ADJUSTING RING

BACKGROUND OF THE INVENTION AND RELATED ART STATEMENT

The present invention relates to a metal laminate gasket with a surface pressure adjusting ring for adjusting surface pressure around a hole to be sealed.

In a metal laminate gasket, it is conventional to provide a bead and/or a wire ring around a hole to be sealed. When the gasket is tightened, the bead and the wire ring are compressed, so that the hole is sealed therearound.

Automobile engines have been developed to provide high power with light weight. In order to satisfy these demands, an aluminum alloy has been used for a cylinder head. The cylinder head made of the aluminum alloy is good for the cylinder head. However, since the aluminum alloy is not so strong against mechanical strength, in case wire rings are used for sealing around cylinder bores of the engine, the cylinder head made of the aluminum alloy may be damaged. Namely, when the cylinder head is tightened, dents of the wire rings are liable to be formed on the cylinder head, through which gas may leak from the cylinder bore.

Even if the wire rings are not formed around the cylinder bores, in case an engine is formed of an aluminum alloy, the engine, especially areas around the cylinder bores, may be easily deformed when high tightening pressure is applied thereto. Therefore, the engine made of the aluminum alloy must be tightened carefully not to deform the same.

Accordingly, it is desirous to provide a gasket having means to properly control surface pressure applied to the areas around the cylinder bores when the engine is tightened.

Accordingly, one object of the present invention is to provide a metal laminate gasket, which can easily regulate surface pressure around a hole to be sealed.

Another object of the invention is to provide a metal laminate gasket as stated above, which can provide a plurality of sealing portions around a hole to be sealed to prevent concentration of sealing pressure at one portion.

A further object of the invention is to provide a metal laminate gasket as stated above, which can securely seal around a hole of the engine without causing creep relaxation of sealing means.

Further objects and advantages of the invention will be apparent from the following description of the invention.

SUMMARY OF THE INVENTION

In accordance with the present invention, a metal laminate gasket is installed in an internal combustion engine having a hole to be sealed. The gasket comprises a plurality of metal plates extending substantially throughout an entire area of the engine, and means for defining the hole of the engine. The hole defining means includes a curved portion to define the hole and at least one flange extending in a direction away from the hole.

The gasket further includes a wire ring, at least one bead formed on one of the metal plates. The wire ring and the bead surround the hole of the engine to seal therearound. A hollow ring is situated between the wire ring and the bead to surround the hole, but the hollow ring may be situated adjacent the curved portion.

The hollow ring is made of a metal plate. The thickness of the metal plate for constituting the hollow ring is adjustable so that surface pressures formed on the wire ring and the bead when the gasket is tightened are regulated by the hollow ring.

The hollow ring is formed of a ring plate with edges. The ring plate is folded so that the edges overlap with each other. The thickness of the hollow ring is mainly controlled by the folded edges.

The hole defining means may be a grommet for covering the bead, wire ring and the hollow ring. On the other hand, the hole defining means may be integrally formed with one of the metal plates.

In the present invention, since the hollow ring is situated near the wire ring and the bead, the surface pressures applied on the wire ring and the bead can be easily and precisely controlled.

DETAILED DESCRIPTION OF PREFERRED EMBODIMENTS

Figure 1:
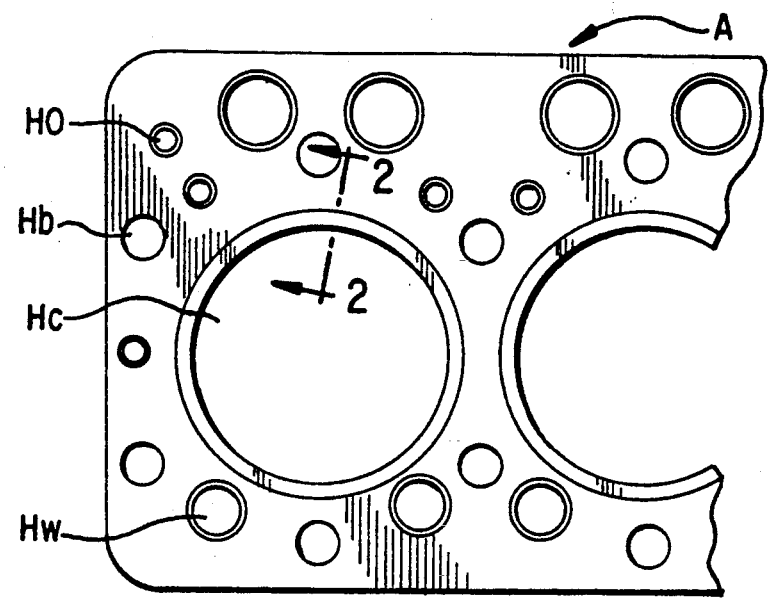
FIG. 1 is a plan view of a part of a first embodiment of a metal laminate gasket of the invention.
Figure 2:
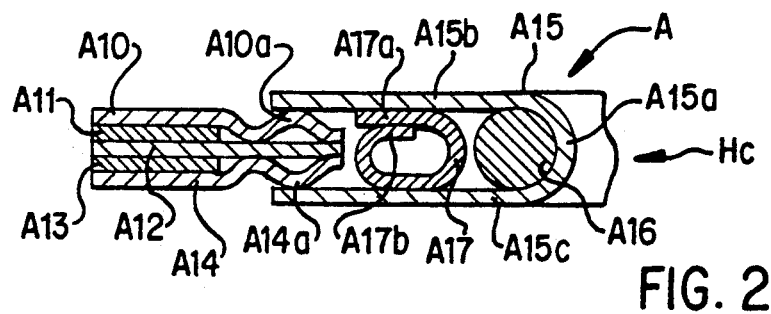
FIG. 2 is an enlarged section view taken along a line 2—2 in FIG. 1.

Referring to FIGS. 1 and 2, a first embodiment A of a metal laminate gasket of the invention is shown. The gasket A is a cylinder head gasket, and includes a plurality of cylinder bores Hc, water holes Hw, oil holes Ho and bolt holes Hb, as in the conventional gasket.

In the present invention, areas around the cylinder bores Hc are sealed in accordance with the present invention. The water holes Hw and the oil holes Ho may be sealed by any sealing means. However, the water holes Hw and other holes may be sealed as in the present invention.

As shown in FIG. 2, the gasket A includes an upper plate A10, three middle plates A11, A12, A13 and a lower plate A14, all of which extend substantially throughout an entire area of the engine. The plates A10, A12, A14 extend to an area near the cylinder bore Hc, while the plates A11, A13 extend to an area slightly away from the cylinder bore Hc.

The plates A10, A14 include beads A10a, A14a near the cylinder bore, respectively. The beads A10a, A14a are laminated over the plate A12 to sandwich the same, and seal around the cylinder bore Hc, when the gasket A is tightened.

A grommet A15 is located adjacent the cylinder bore Hc. The grommet A15 includes a curved portion A15a to define the cylinder bore Hc, and upper and lower flanges A15b, A15c. The upper flange A15b is located on the bead A10a, and the lower flange A15c is located under the bead A14a.

Situated adjacent to the curved portion A15a and between the upper and lower flanges A15b, A15c is a wire ring A16 extending around the cylinder bore Hc. The wire ring A16 is formed of a plurality of wires known already in the art.

A hollow tube A17 is located between the wire ring A16 and the beads A10a, A14a to surround the cylinder bore Hc. The tube A17 is basically made of an annular plate and is folded so that edges A17a, A17b overlap with each other. The edges A17a, A17b are situated parallel to the flanges A15b, A15c to provide predetermined thickness. Therefore, when the hollow tube A17 is tightened, the hollow tube A17 is resiliently compressed and provides the predetermined thickness.

When the gasket A is situated between a cylinder head and a cylinder block (both not shown) and is tightened, the beads A10a, A14a, the wire ring A16 and the hollow tube A17 together with the grommet A15 are compressed. The gasket A is compressed so that a space inside hollow tube A17 is eliminated. Namely, the wire ring A16 and the beads A10a, A14a are compressed to the thickness as determined by the thickness of the hollow tube A17.

In the invention, the thickness of the annular plate for the hollow tube A17 is selected to regulate surface pressures at the wire ring A16 and the beads A10a, A14a. Namely, in case the annular plate is made of a thick plate, the wire ring A16 and the beads A10a, A14a are not compressed so strongly. The wire ring A16 and the beads A10a, A14a do not provide high surface pressures.

On the other hand, in case the annular plate is made of a thin plate, the wire ring A16 and the beads A10a, A14a can be tightened strongly. Therefore, the wire ring A16 and the bead A10a, A14a provide high surface pressures.

When the gasket A is tightened, the hollow tube A17 also provides resilient surface pressure thereat. Therefore, the area outside the cylinder bore Hc is sealed by the wire ring A16, the hollow tube A17 and the beads A10a, A14a. Since the sealing pressure is not concentrated at one portion, the cylinder block around the cylinder bore Hc as well as the cylinder head are not damaged or deformed at all.

In the present invention, the proper surface pressure can be formed around the cylinder bore by selecting the thickness of the annular plate for the hollow tube A17. Also, the surface pressure around the cylinder bore Hc can be easily changed or adjusted by changing the thickness of the annular plate.

Figure 3:
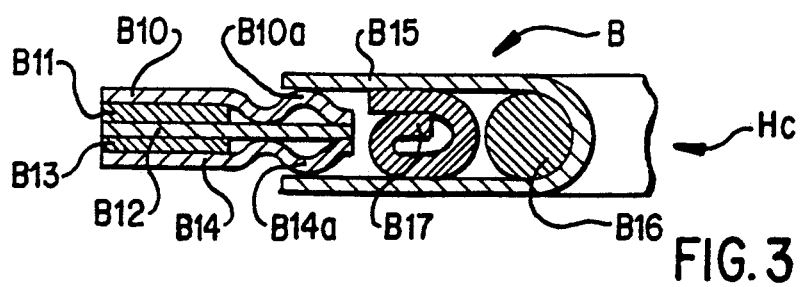
FIGS. 3 and 4 are section views, similar to FIG. 2, for showing second and third embodiments of the gasket of the invention.

FIG. 3 shows a second embodiment B of a metal laminate gasket of the invention. The gasket B is formed of plates B10-B14, a grommet B15, a wire ring B16 and a hollow tube A17, as in the gasket A. However, the hollow tube B17 is made of a thick annular plate.

Therefore, when the gasket B is tightened between the cylinder head and the cylinder block, the wire ring B16 and the beads B10a, B14a are not compressed so strongly by the hollow tube B17. The surface pressures at the wire ring B16 and beads B10a, B14a are not made strong. The gasket B operates as in the gasket A.

Figure 4:
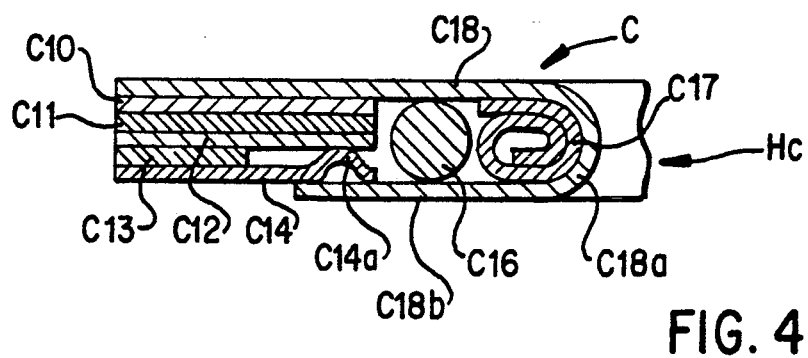

FIG. 4 shows a third embodiment C of a metal laminate gasket of the invention. The gasket C includes plates C10-C14, a wire ring C16 and a hollow tube C17, as in the gasket A. However, in the gasket C, a grommet is not used, and instead, an outer plate C18 with a curved portion C18a and a flange C18b is used to cover the wire ring C16 and the hollow tube C17. Also, the arrangement of the wire ring C16 and the hollow tube C17 is changed.

In particular, the outer plate C18 is situated above the plate C10 and surrounds the hollow tube C17, the wire ring C16 and a bead C14a of the plate C14. In the gasket C, since one bead C14a is formed around the cylinder bore Hc, the hollow tube C17 is made thick by folding an annular plate. Also, compressibility of the gasket around the cylinder bore is not great. Since the annular plate for the hollow ring C17 is not made thick, the hollow ring C17 can be relatively easily compressed. In the gasket C, the grommet is not used, but the gasket C operates as in the gasket A.

In the present invention, the area around the cylinder bore is sealed by the wire ring, the hollow tube and at least one bead. Since the surface pressure is not concentrated at one portion when the gasket is tightened, deformation of the cylinder block around the cylinder bore as well as the cylinder head are prevented. Also, the surface pressures formed on the wire ring and the bead are controlled and regulated by changing the thickness of the annular plate for the hollow tube. Therefore, creep relaxation of the wire ring and the bead is prevented.

While the invention has been explained with reference to the specific embodiment of the invention, the explanation is illustrative and the invention is limited only by the appended claims.

What is claimed is:

1. A metal laminate gasket for an internal combustion engine having a hole to be sealed, comprising,
   at least three metal plates extending substantially throughout an entire area of the engine and formed of upper, middle and lower plates, each metal plate having a first hole larger than the hole of the engine, said upper and lower plates having beads formed around the respective first holes,
   a grommet for defining the hole of the engine and having a curved portion and upper and lower flanges extending in a direction away from the hole, said curved portion being located inside the first holes of said at least three metal plates, said upper flange being located over the bead of the upper plate without extending over a substantial portion of the upper plate and said lower flange being located under the bead of the lower plate without extending over a substantial portion of the lower plate,
   a wire ring situated outside the curved portion relative to the hole of the engine and sandwiched between the upper and lower flanges, and
   a hollow ring situated between the curved portion and the beads to surround the hole of the engine, said hollow ring being made of a metal ring plate with edges and being folded so that the edges overlap with each other, a thickness of the metal plate for constituting the hollow ring being adjustable so that when the gasket is tightened, the beads, the hollow ring and the wire ring are compressed together with the flanges of the grommet up to a thickness of the hollow ring to thereby regulate surface pressures formed on the wire ring and the beads.

2. A metal laminate gasket according to claim 1, wherein the wire ring, the hollow ring and the bead are situated between the flanges.

3. A metal laminate gasket according to claim 1, wherein the hollow ring is situated between the beads and the wire ring.

4. A metal laminate gasket according to claim 1, wherein said middle plate is located between the upper and lower plates, and the beads of the upper and lower plates are oriented in directions away from the middle plate.

5. A metal laminate gasket according to claim 4, wherein said edges of the hollow ring are arranged parallel to the flanges of the grommet.

6. A metal laminate gasket according to claim 5, further comprising intermediate plates situated between the upper and middle plates and between the lower and middle plates, respectively, said intermediate plates having second holes corresponding to the first holes, the diameter of the second hole being greater than that of the first hole so that the beads do not overlap the intermediate plates.

7. A metal laminate gasket for an internal combustion engine having a hole to be sealed, comprising, at least three metal plates extending substantially throughout an entire area of the engine and formed of upper, middle and lower plates, said middle and lower plates having first holes larger than the hole of the engine, said lower plate having a bead around the first hole thereof, means for defining the hole of the engine integrally formed with the upper plate, said hole defining means having a curved portion extending from the upper plate to define the hole of the engine and a flange extending in a direction away from the hole, said curved portion being located inside the first holes of the middle and lower plates, said flange being located under the bead of the lower plate without extending over a substantial portion of the lower plate, a wire ring situated outside the curved portion relative to the hole of the engine and sandwiched between the upper plate and the flange, and a hollow ring situated between the bead and the curved portion to surround the hole of the engine, said hollow ring being made of a metal ring plate with edges and being folded so that the edges overlap with each other, a thickness of the metal plate for constituting the hollow ring being adjustable so that when the gasket is tightened, the bead, the hollow ring and the wire ring are compressed together with the flange up to a thickness of the hollow ring to thereby regulate surface pressures formed on the wire ring and the bead.

8. A metal laminate gasket according to claim 7, wherein said edges of the hollow ring are arranged parallel to the flange.

9. A metal laminate gasket according to claim 8, further comprising an intermediate plate situated between the lower and middle plates, said intermediate plate having a second hole corresponding to the first holes, the diameter of the second hole being greater than that of the first hole so that the bead does not overlap the intermediate plate.

* * * * *